United States Patent
Ye et al.

(10) Patent No.: US 8,666,076 B2
(45) Date of Patent: Mar. 4, 2014

(54) METHOD OF ELLIPTIC CURVE CRYPTOGRAPHY USING EW-MOF ON SCALAR MULTIPLICATION

(75) Inventors: Hung-Nan Ye, Hsinchu (TW); Kuo-Chen Wang, Hsinchu (TW); Rong-Hong Jan, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 133 days.

(21) Appl. No.: 13/446,430

(22) Filed: Apr. 13, 2012

(65) Prior Publication Data
US 2013/0163760 A1   Jun. 27, 2013

(30) Foreign Application Priority Data
Dec. 23, 2011   (TW) .............................. 100148211 A

(51) Int. Cl.
*H04L 29/06* (2006.01)
(52) U.S. Cl.
USPC ......................................... 380/270; 380/255

(58) Field of Classification Search
None
See application file for complete search history.

(56) References Cited

U.S. PATENT DOCUMENTS 8,345,864 B1*   1/2013   Robinson et al. ............... 380/30
2009/0323933 A1*  12/2009   Longa et al. .................... 380/30

* cited by examiner

*Primary Examiner* — Pramila Parthasarathy
(74) *Attorney, Agent, or Firm* — Wang Law Firm, Inc.; Li K. Wang; Stephen Hsu

(57) ABSTRACT

A method of elliptic curve cryptography (ECC) using the enhanced window-based mutual opposite form (EW-MOF) on scalar multiplication. First, an elliptic curve and a base point on the elliptic curve are selected. Next, essential pre-computed points for a selected window size are calculated. Then, a private key is randomly generated and the mutual opposite form (MOF) is used to convert the private key's binary representation into a signed binary representation. Finally, a public key is calculated by using the enhanced window (EW) method. By greatly reducing the number of essential pre-computed points, the EW-MOF reduces average key generation time (including pre-computation time).

7 Claims, 5 Drawing Sheets

METHOD OF ELLIPTIC CURVE CRYPTOGRAPHY USING EW-MOF ON SCALAR MULTIPLICATION

CROSS-REFERENCE TO RELATED APPLICATION

This application claims the benefit of Taiwan Patent Application No. 100148211, filed on Dec. 23, 2011, in the Taiwan Intellectual Property Office, the disclosure of which is incorporated herein in its entirety by reference.

BACKGROUND OF THE INVENTION

1. Field of the Invention

The present invention relates to the field of elliptic curve cryptographies, and more particularly to a method of elliptic curve cryptography (ECC) using enhanced window-based mutual opposite form (EW-MOF) on scalar multiplication algorithm capable of randomly generating a private key and speeding up the public key generation.

2. Description of the Related Art

In recent years, wireless (sensing) networks are used extensively in different areas such as military affairs, environmental surveillance and home care, and security becomes increasingly more important. Cryptography is a basic method providing safe services of the wireless (sensing) network. As a wireless (sensing) module in the wireless (sensing) networks has limited resources (or electric power), it is necessary to reduce the loads of computation, communication and memory for cryptography.

Based on the foregoing reason, research and development centers and related industries developed various cryptography mechanisms, such as RSA cryptography, DSA cryptography, and elliptic curve cryptography (ECC). The following table compares the number of bits in the encryption keys of the RSA cryptography and the elliptic curve cryptography under the same level of security:

| RSA Cryptography (bits) | Elliptic Curve Cryptography (bits) |
|---|---|
| 1024 | 160 |
| 2048 | 224 |
| 3072 | 256 |
| 7680 | 384 |
| 15360 | 512 |

In other words, the elliptic curve cryptography has much less bits in the key and a faster processing speed than those of other conventional cryptographs (such as RSA) under the same level of security. In other words, each bit of the key of the elliptic curve cryptography can provide much better security than that of the conventional cryptography, and thus the elliptic curve cryptography is very suitable to be used in various sensing node devices in the wireless (sensing) network such as a smart card, a mobile phone or a wireless mobile device used with an environment of limited electric power and memory space.

For example, the Elliptic Curve Diffie-Hellman (ECDH) and the Elliptic Curve Digital Signature Algorithm (ECDSA) are applied to various different sensing node devices in the elliptic curve cryptography, which scalar multiplication takes approximately 80% of the computation time, and such computation time will consume much electric power and shorten the service time of the sensing node device.

Further, the elliptic curve Diffie-Hellman algorithm is used as an example. In FIG. 1, a wireless sensing network includes a sensing node device A and a sensing node device B, wherein the private key, public key and secret key of the sensing node device A are $K_A$, $Q_A$ and $R_A$ respectively, and the private key, public key and secret key of the sensing node device B are $K_B$, $Q_B$ and $R_B$ respectively, wherein $R_A$ and $R_B$ are represented by the equations below:

$$R_A = K_A \times Q_B; R_B = K_B \times Q_A; \text{ and } R_A = R_B$$

Further, Q=KP, wherein P and Q are two points on the elliptic curve, and K is a positive integer, and the following formula converts the private key K into a binary string list:

$$K = \sum_{j=0}^{L-1} k_j 2^i, \text{ where } k_j \in \{1, 0\}$$

Assumed that D=6599=$(1100111000111)_2$, Q obtained from the computation process of K contains P, 2P, 3P, 6P, 12P, 24P, 25P, 50P, 51P, 102P, 103P, 206P, 412P, 824P, 1648P, 1649P, 3298P, 3299P, 6598P, 6599P; it is necessary to execute the computation for 19 times.

Wherein, the private key K is converted into a string list by using different conversion methods. If a mutual opposite form (MOF) is used, the private key K is converted into the string list as follows:

$$K = 6599 = \frac{\begin{array}{c}1100111000111\\1100111000111\end{array}}{10\bar{1}0100\bar{1}00100\bar{1}} = (10\bar{1}0100\bar{1}00100\bar{1})_2$$

If a complementary recording method is used, the private key K is converted into the string list as follows:

$K=6599=(1100111000111)_2$ $\bar{K}=(0011000111000)_2$ $K=2^{13}-\bar{K}-1=(100\bar{1}\bar{1}000\bar{1}\bar{1}\bar{1}00\bar{1})_2$ If a non-adjacent form (NAF) is used, the private key K is converted into the string list as follows:

$K=6599=(1100111000111)_2=(10\bar{1}0100\bar{1}00100\bar{1})_2$

The following table compares the aforementioned three conversion methods:

| Conversion Method | Non adjacent Form (NAF) | Mutual Opposite Form (MOF) | Complementary Recoding |
|---|---|---|---|
| Hamming Weight | Large | Large | Small |
| Scanning Direction | From right to left | From right to left From left to right | From right to left From left to right |
| Average Execution Time | Large | Medium | Small |

If a window method is used, the private key K is converted into the string list as follows:

If the window size w is equal to 2, the private key K is calculated as follows:

$K=6599=(1100111000111)_2$ $w=2 \Rightarrow K=(11\ 00\ 11\ 1\ 000\ 11\ 1)_2$

Therefore, the pre-computed point is 3 P.

If the window size w is equal to 3, then the private K is calculated as follows:

$$K=6599=(1100111000111)_2$$

$$w=3 \Rightarrow K=(11\ 00\ 111\ 000\ 111)_2$$

Therefore, the pre-computed points are 3P, 5P and 7P.

As shown above, although the window method requires calculating the pre-computed points, it can reduce the times of computation. In addition, the aforementioned mutual opposite form, complementary recording and non-adjacent form are used together with the window method, the pre-computed points are listed as follows.

A. If the mutual opposite form (MOF) is combined with the window method, and the window size w is 5, then the pre-computed points include 3P, 5P, 7P, 9P, 11P, 13P and 15P.

B. If the non-adjacent form (NAF) is combined with the window method, and the window size w is 5, then the pre-computed points include 3P, 5P, 7P, 9P, 11P, 13P, 15P, 17P and 21P.

C. If the complementary recording is combined with the window method, and the window size w is 5, then the pre-computed points include 3P, 5P, 7P, 9P, 11P, 13P, 15P, 17P, 21P, 23P, 25P, 27P, 29P and 31P.

The average execution time of using the non-adjacent form of the three conversion method is longer, and each conversion method combined with the window method and the complementary recording combined with the window method requires calculating most pre-computed points. If we can combine the mutual opposite form with the window method, we can shorten the average execution time significantly and reduce the computation and memory space, so as to decrease the consumption of electric power and memory of the sensing node device effectively.

SUMMARY OF THE INVENTION

In view of the aforementioned problems of the prior art, it is a primary objective of the invention to provide a method of elliptic curve cryptography (ECC) using the enhanced window-based mutual opposite form (EW-MOF) on scalar multiplication to overcome the problem of the conventional sensing node device that consumes much more electric power.

To achieve the foregoing objective, the present invention provides a method of ECC using EW-MOF on scalar multiplication applied in a wireless sensing network system including sensing node devices having a processing module and a storing module therein. First, an elliptic curve and a base point on the elliptic curve are selected by the processing module. Second, essential pre-computed points are calculated according to the selected window size by the processing module. Then, a private key is randomly generated by the processing module, and a mutual opposite form (MOF) is used to convert a binary representation of the private key into a signed binary representation. Finally, an enhanced window (EW) method is used to calculate a public key by the processing module. By decreasing the number of pre-computed points significantly, the method of the present invention can shorten the generation time (including the time for calculating the pre-computed points) of the public key.

Wherein, the enhanced window-based algorithm generates the essential pre-computed point by the following formula:

$$\{2P, 4P, 6P\ldots, (3+2S)P, (5+6S)P, (7+10S)P, \ldots\}$$

In the formula above, the numeric value of S is the number of even essential pre-computed points, and S≥1, and {the largest essential pre-computed point plus $(2S)P$}≥$(2^{2-1}-1)P$ (the largest pre-computed point).

Wherein, the window size (w) in the enhanced window-based algorithm is limited to a condition of window size (w)≥4.

Wherein, a private key is further converted into a binary string list, and the string list is represented by a signed binary string list according to a mutual opposite form coding method.

Wherein, each of the essential pre-computed points and the string list coded by the mutual opposite form are used to calculate and generate a public key.

To achieve the other foregoing objective, the present invention further provides a method of elliptic curve cryptography (ECC) using the enhanced window-based mutual opposite form (EW-MOF) on scalar multiplication applied in a wireless sensing network including sensing node devices having a processing module and a storing module therein. First, selecting an elliptic curve by the processing module. Second, selecting a base point P on the elliptic curve by the processing module, and P=(X,Y), wherein X and Y are coordinates of the elliptic curve. Then, using the selected window size to compute essential pre-computed points by the processing module, when the sensing node devices arranged in the wireless sensing network receives the elliptic curve and the base point. Finally, saving a numeric value of each of the essential pre-computed point into the storing module of each sensing node device, after each of the essential pre-computed points is computed.

In summation of the description above, the number of essential pre-computed points is reduced in advance and the private key can be represented by a string list coded by the mutual opposite form. As a result, the time required for randomly generating a private key and using the elliptic curve to derive the public key can be shortened effectively.

The aforementioned and other objects, technical characteristics, and advantages of the present invention will become apparent with the detailed description of preferred embodiments accompanied with related drawings as follows.

DETAILED DESCRIPTION OF THE PREFERRED EMBODIMENTS

Figure 1:
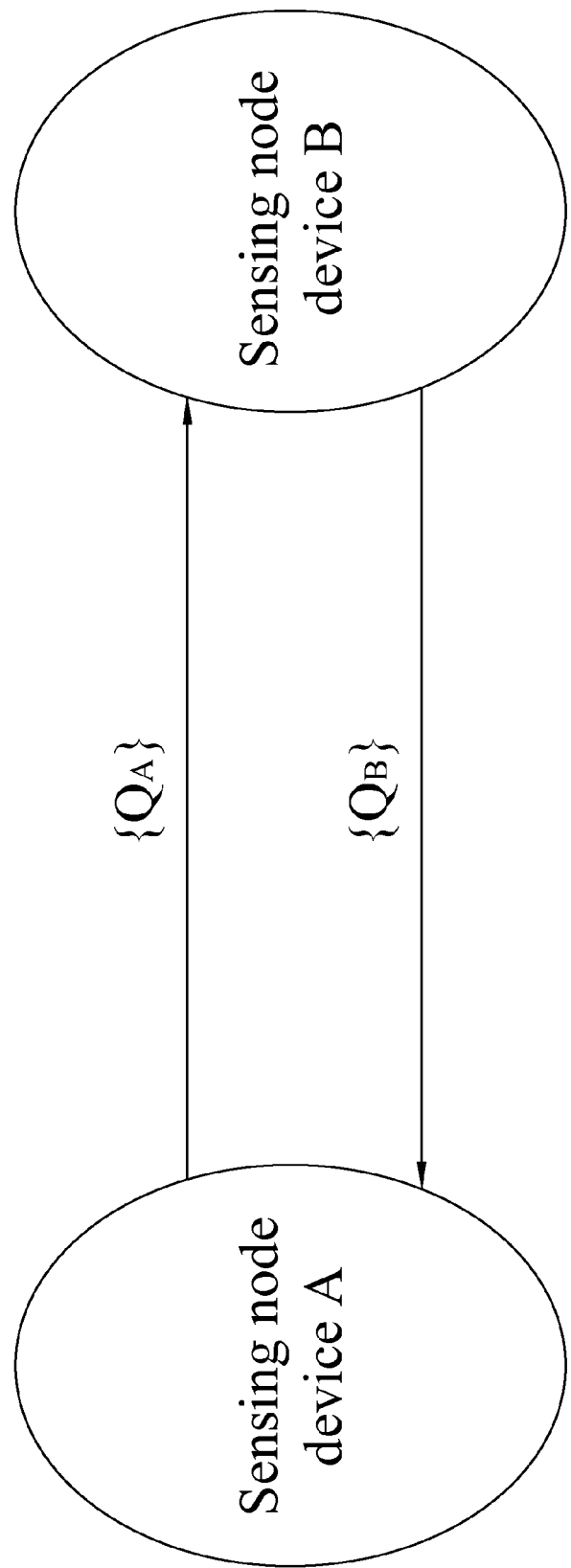
FIG. 1 is a schematic view of a wireless sensing network.

The method of elliptic curve cryptography (ECC) using the enhanced window-based mutual opposite form (EW-MOF) on scalar multiplication of the present invention is described in details with reference to related figures as follows. It is noteworthy to point out that like elements illustrated in the drawings are represented by the same respective numerals, and all figures are drawn for the ease of explanation of the basic teachings of the present invention only, and thus are not drawn with the exact precision or scale ratio or intended for limiting the scope of the invention.

Figure 2:
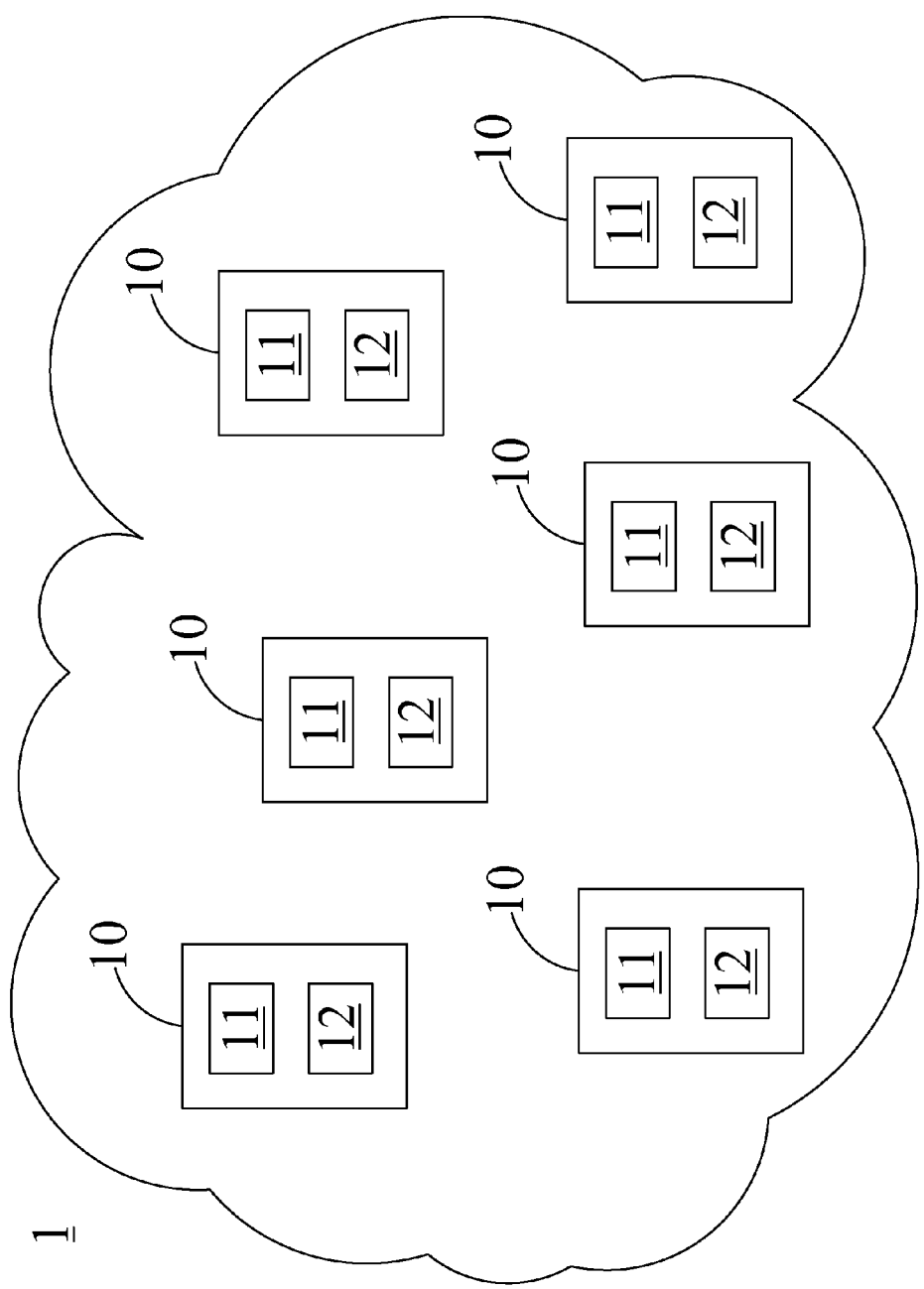
FIG. 2 is a schematic view of the present invention of a wireless sensing network.

With reference to FIG. 2 for the schematic view of the present invention of a wireless sensing network system, the present invention discloses a method of elliptic curve cryptography (ECC) using the enhanced window-based mutual opposite form (EW-MOF) on scalar multiplication applied in the wireless sensing network system 1 including sensing node devices 10 having a processing module 11 and a storing module 12 therein. First, an elliptic curve and a base point on the elliptic curve are selected by the processing module 11. Next, essential pre-computed points are calculated according to a selected window size by the processing module 11. Then, saving a numeric value of each of the essential pre-computed point into the sensing node device 10 by the storing module 12, when each of the essential pre-computed points is computed. Then, a private key is randomly generated and the mutual opposite form (MOF) is used to represent a binary string list by a signed binary representation.

In the present invention, the essential pre-computed point generated by the enhanced window-based algorithm is a member of the following set:

$$\{2P, 4P, 6P \ldots, (3+2S)P, (5+6S)P, (7+10S)P, \ldots\}$$

Where, S is the number of even essential pre-computed points and $S \geq 1$, and {the largest essential pre-computed point plus $(2S)P\} \geq (2^{w-1}-1)P$ (the largest pre-computed point). The window size $(w) \geq 4$ is further limited in the enhanced window-based algorithm.

For example, if the enhanced window-based algorithm is used in the mutual opposite form (MOF), the window size is set to 6, and the largest essential pre-computed point is 31P, then the essential points are listed below of S equals to 1, 2 or 3 respectively.

If S=1, then the essential point belongs to {2P, 5P, 11P, 17P, 23P, 29P}.

Since $(29P+2P) \geq 31P$, therefore the number of essential points is 6.

If S=2, then the essential point belongs to {2P, 4P, 7P, 17P, 27P}.

Since $(27P+4P) \geq 31P$, therefore the number of essential points is 5.

If S=3, then the essential point belongs to {2P, 4P, 6P, 9P, 23P, 37P}.

Since $(37P+6P) \geq 31P$, therefore the number of essential points is 6.

The conventional window algorithm requires calculating a total number of 15 essential points, respectively: 3P, 5P, 7P, 9P, 11P, 13P, 15P, 17P, 19P, 21P, 23P, 25P, 27P, 29P and 31P, and the enhanced window-based algorithm requires calculating at least 5 essential pre-computed points, respectively: {2P, 4P, 7P, 17P, 27P}. Obviously, the enhanced window-based algorithm of the present invention can reduce the number of pre-computed points effectively.

Figure 3:
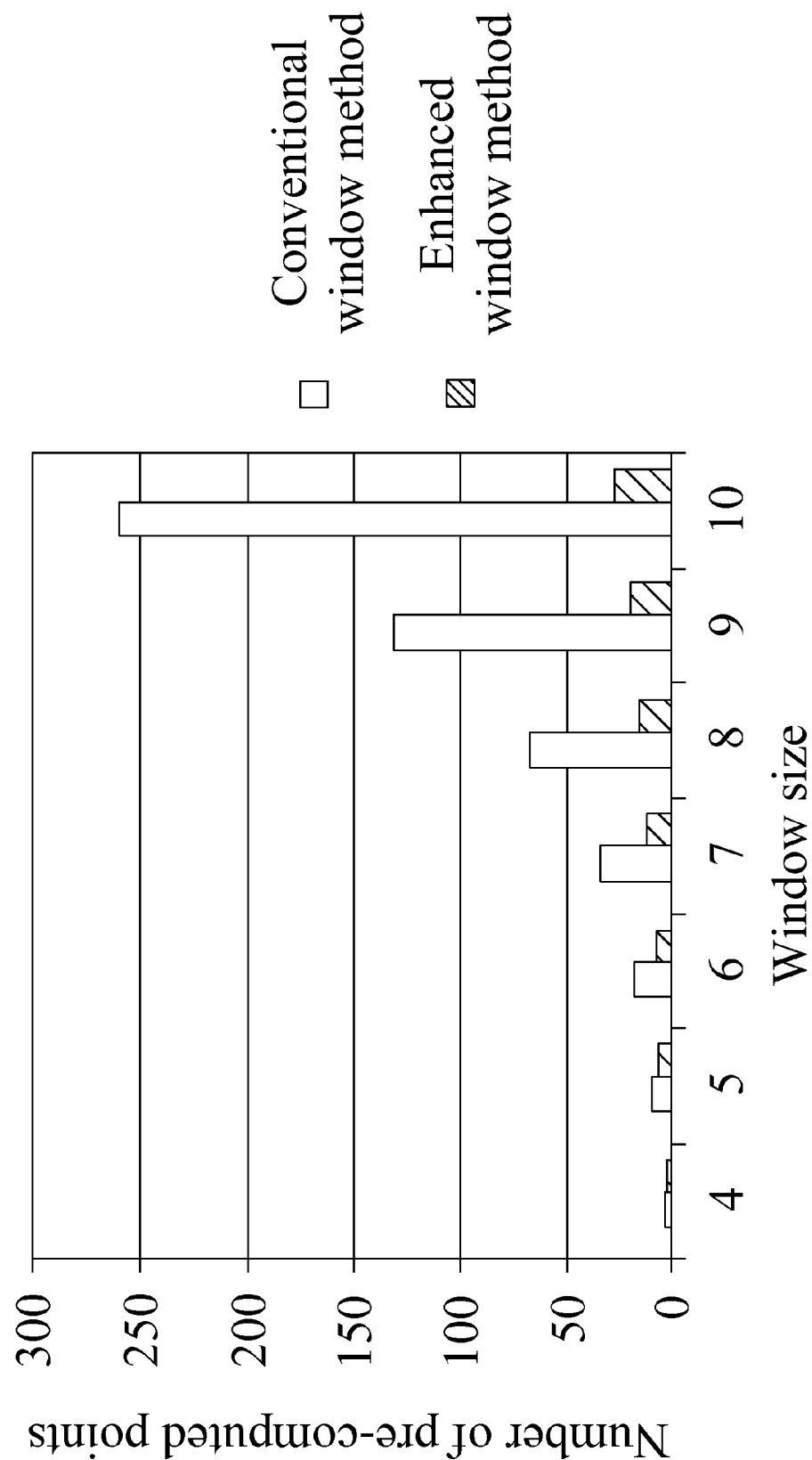
FIG. 3 is a histogram, comparing the quantity of pre-computed points under the condition of the same window size for an enhance window based method and a conventional window method.

With reference to FIG. 3 for the graph that compares the quantity of pre-computed points under the condition of the same window size for an enhance window based method and a conventional window method, the enhanced window-based algorithm generates much less essential pre-computed points than the conventional window algorithm when the window size gets larger. Obviously, the enhanced window-based algorithm of the present invention is a main factor of improving the conventional elliptic curve cryptography.

The present invention further represents a private key by a binary string list, and represents the string list by a signed binary representation through a mutual opposite form (MOF). In summary, the number of essential pre-computed points is reduced in advance and a private key is represented a string list coded by the mutual opposite form (MOF). In other words, the time required for randomly generating a private key and using the elliptic curve to derive the public key can be shortened effectively.

Figure 4:
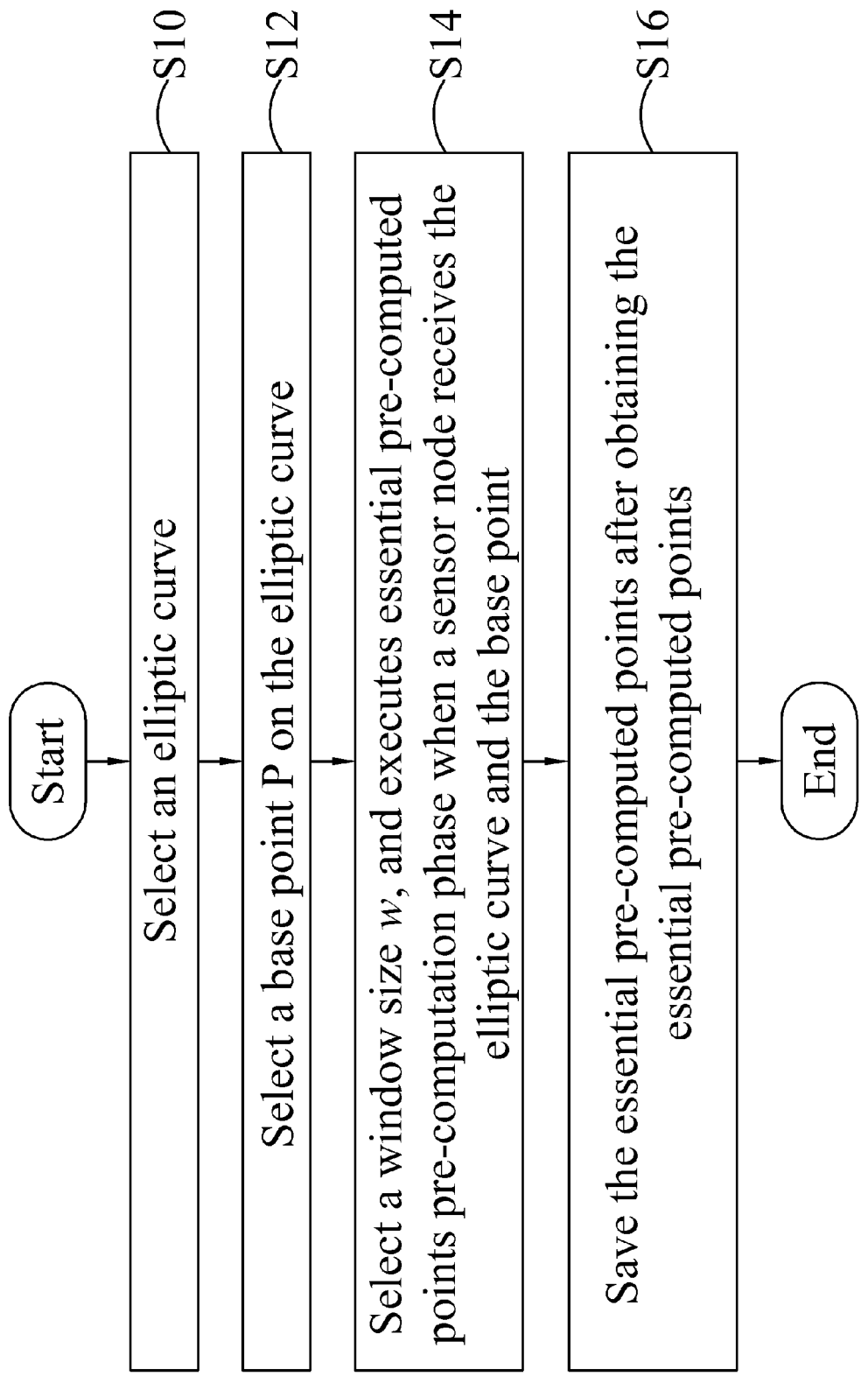
FIG. 4 is a flow chart of applying the present invention in an initial parameter setting of a wireless sensing network.

With reference to FIG. 4 for a flow chart of applying a method of elliptic curve cryptography (ECC) using the enhanced window-based mutual opposite form (EW-MOF) on scalar multiplication in accordance with the present invention for an initial parameter setting in a wireless sensing network, the application comprises the following steps:

(S10) Select an elliptic curve, wherein the elliptic curve adopts a finite field such as a prime field (GF(p)), and the elliptic curve satisfies the following equation: $y^2=x^3+ax+b$, where $a, b \in GF(p)$, and $4a^3+27b^2 \neq 0$.

(S12) Select a base point P of the elliptic curve, wherein P=(X, Y), and X and Y are coordinates of the base point P in compliance with the elliptic curve.

(S14) Select a window size, and compute essential pre-computed points according to the window size when a sensing node device arranged in the wireless sensing network receives the elliptic curve and the base point.

(S16) Save the numeric value of each essential pre-computed point into the sensing node device when the essential pre-computed point is computed.

Figure 5:
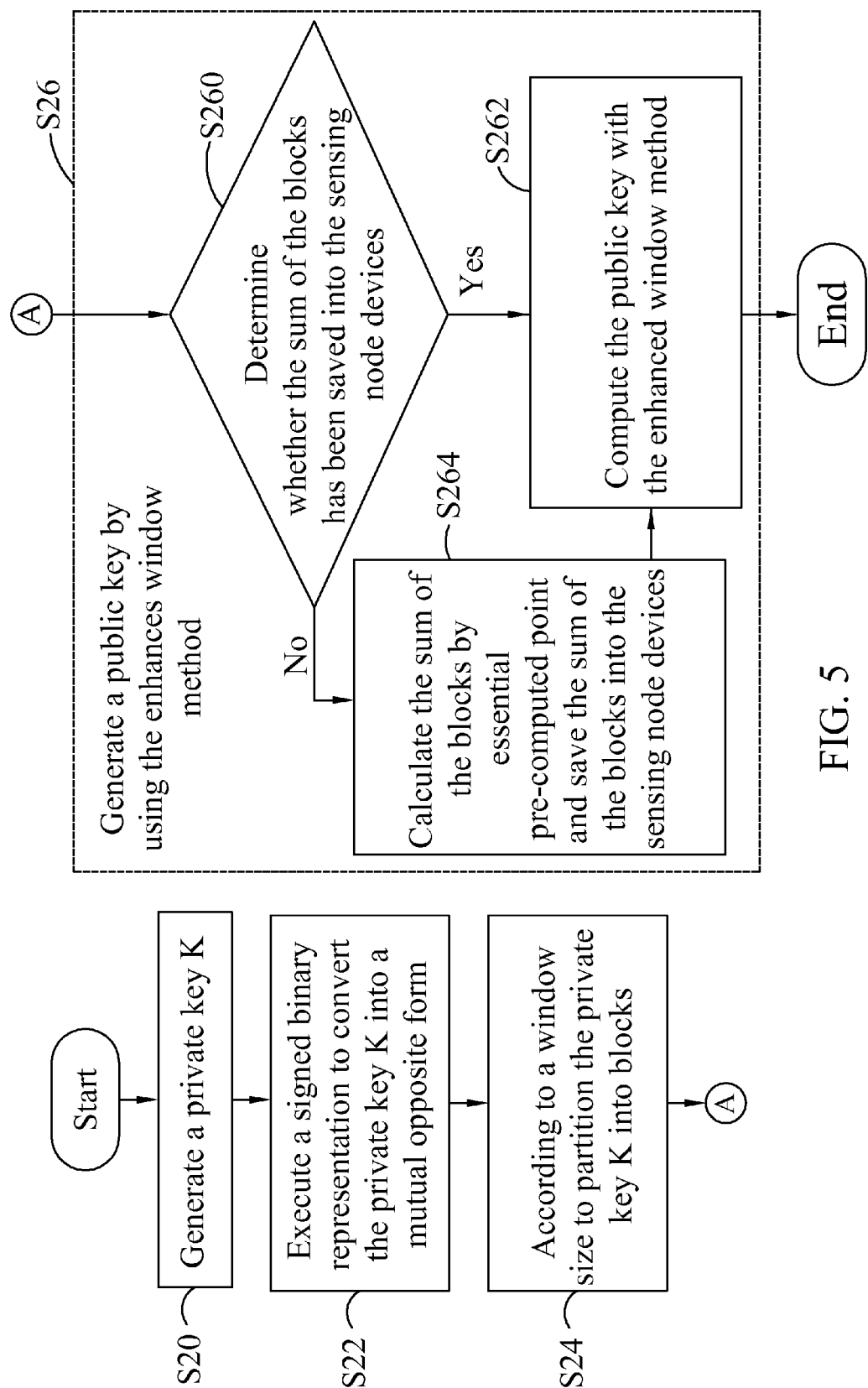
FIG. 5 is a flow chart of applying the present invention to generate a public key in a wireless sensing network.

With reference to FIG. 5 for a flow chart of generating a public key in a wireless sensing network by using a method of elliptic curve cryptography (ECC) using the enhanced window-based mutual opposite form (EW-MOF) on scalar multiplication in accordance with the present invention, the method comprises the following steps:

(S20) Randomly generate a private key K.

(S22) Convert the private key K into a binary string list, and use a mutual opposite form (MOF) to represent the string list by a signed binary representation.

(S24) Generate essential pre-computed points according to a selected window size, and save the essential pre-computed points in the sensing node device.

(S26) Generate a public key, by using the essential pre-computed points and a private key both generated by the enhanced window-based algorithm and used a mutual opposite form to code the string list to represent for.

As described above, the time required for computing a public key derived by the elliptic curve can be reduced, since less essential pre-computed points are required and the private key is represented by a string list coded by the mutual opposite form.

In the present invention, the Step (S26) further comprises the following steps:

(S260) Determine whether each essential pre-computed point generated by the enhanced window-based algorithm this time has been saved into the sensing node device. If yes, then go to the next step, or else go to Step (S264).

(S262) Directly use the essential pre-computed points generated by the enhanced window-based algorithm and the mutual opposite form to code the string list for the calculation to generate a public key.

(S264) Generate other essential pre-computed points which have not been saved but will be used according to the pre-computed points in the Step (S24), and save the generated pre-computed points into sensing node device, and process the step (S262).

Therefore, the sensing node device saves its generated essential pre-computed points, and only generates essential pre-computed points which have not been saved, so that the sensing node device can further save electric power consumption.

In summation of the description above, the method of elliptic curve cryptography (ECC) using the enhanced window-based mutual opposite form (EW-MOF) on scalar multiplication in accordance with the present invention has one or more of the following advantages:

The enhanced window-based algorithm of the invention can reduce the number of pre-computed points effectively.

The scalar multiplication algorithm of the present invention further reduces the time required for randomly generating a private key, using the mutual opposite form to code the private key and then generating a public key by using a small number of the essential pre-computed points.

While the invention has been described by means of specific embodiments, numerous modifications and variations could be made thereto by those skilled in the art without departing from the scope and spirit of the invention set forth in the claims.

What is claimed is:

1. A method of elliptic curve cryptography (ECC) using enhanced window-based mutual opposite form (EW-MOF) on scalar multiplication, comprising the steps of:

using an enhanced window-based algorithm to compute essential pre-computed points by a sensing node device arranged in a wireless sensing network according to a selected window size; and saving the essential pre-computed points by the sensing node device when the essential pre-computed points are computed;

wherein the essential pre-computed points are saved into the sensing node device, so as to reduce the average time required for randomly generating a private key, and using the elliptic curve to derive a public key can be shortened effectively;

wherein the enhanced window-based algorithm generates the essential pre-computed points by the following formula:

$$\{2P, 4P, 6P \ldots, (3+2S)P, (5+6S)P, (7+10S)P, \ldots\};$$

wherein S is the number of even essential pre-computed points S≥1, and {the largest essential pre-computed point plus $(2S)P$}≥$(2^{w-1})P$ (the largest pre-computed point).

2. The method of ECC using EW-MOF on scalar multiplication as recited in claim 1, wherein the window size (w) in the enhanced window-based algorithm is limited to a condition of window size (w)≥4.

3. The method of ECC using EW-MOF on scalar multiplication as recited in claim 2, wherein a private key is further converted into a binary string list, and the string list is represented by a signed binary string list according to a mutual opposite form coding method.

4. The method of ECC using EW-MOF on scalar multiplication as recited in claim 3, wherein each of the essential pre-computed points and the string list coded by the mutual opposite form are used to calculate and generate the public key.

5. A method of elliptic curve cryptography (ECC) using enhanced window-based mutual opposite form (EW-MOF) on scalar multiplication applied in a wireless sensing network including sensing node devices having a processing module and a storing module therein, comprising the steps of:

selecting an elliptic curve by the processing module;

selecting a base point P on the elliptic curve by the processing module, and P=(X, Y), wherein X and Y are coordinates of the elliptic curve;

using the selected window size to compute essential pre-computed points by the processing module, when the sensing node devices arranged in the wireless sensing network receive the elliptic curve and the base point; and saving a numeric value of each of the essential pre-computed point into the sensing node devices by the storing module, after each of the essential pre-computed point is computed;

wherein the elliptic curve adopts a finite field, and the elliptic curve satisfies the equation of $y^2=x^3+ax+b$; where, a, b∈GF(p), and $4a^3+27b^2\neq 0$.

6. The method of ECC using EW-MOF on scalar multiplication as recited in claim 5, further comprising steps of generating a public key, comprising:

randomly generating a private key;

converting the private key into a mutual opposite form by executing a signed binary representation;

according to a window size to partition the private key into blocks; and saving sum of the blocks for the computation to generate the public key.

7. The method of ECC using EW-MOF on scalar multiplication as recited in claim 6, wherein the step of generating the public key further comprises the steps of: determining whether the sum of the blocks has been saved into the sensing node devices;

calculating the sum of the blocks by essential pre-computed point and save the sum of the blocks into the sensing node devices, if the sum of the blocks has not been saved in sensing node devices; and generating the public key by using the enhances window method by the sensing node devices, if the sum of the blocks has been saved in sensing node devices.

* * * * *